United States Patent [19]
Krexner et al.

[11] Patent Number: 6,005,924
[45] Date of Patent: Dec. 21, 1999

[54] COMBINATION DEVICE INCLUDING FAX MEANS AND TELEPHONE MEANS AND INCLUDING AN ACTIVE FAX SWITCH

[75] Inventors: Christian Krexner, Vienna; Antonius Van De Graaf, Klosterneuburg; Kurt Praxl, Pressbaum; Peter Sattler, Vienna, all of Austria

[73] Assignee: U.S. Philips Corporation, New York, N.Y.

[21] Appl. No.: 09/140,433

[22] Filed: Aug. 26, 1998

[30] Foreign Application Priority Data

Aug. 28, 1997 [EP] European Pat. Off. .............. 97890172

[51] Int. Cl.[6] .................................................. H04M 11/00
[52] U.S. Cl. ...................................... 379/100.16; 358/442
[58] Field of Search ...................................... 358/442, 440, 358/468, 400; 379/100.14–100.17, 100.05, 100.06, 100.01, 93.08–93.11

[56] References Cited

U.S. PATENT DOCUMENTS 5,014,296  5/1991  Saigano ..................................... 379/67
5,877,872  3/1999  Nomura et al. ........................ 379/93.09

*Primary Examiner*—Wing F. Chan

[57] ABSTRACT

A fax and phone combination device. The combination device is coupled to an external phone. From a phone line, the combination device receives a call signal, a fax signal, and an information signal. The call signal precedes the fax signal and the information signal. The combination device comprises a fax, an internal phone, and a call signal processor. The call processor processes the call signal received by the combination device and produces a first ringing signal from the call signal. The first ringing signal is intended for the internal phone. The combination device further comprises a ringing signal generator for generating a second ringing signal that is intended for the external phone, and a switch coupled to the fax, the internal phone, and the call processor. A call pulse in the call signal causes the switch to switch the combination device in a simulated receiving mode. In the simulated receiving mode, the fax signal detector detects whether the fax signal is present. If the fax signal is present, the fax signal is routed to the fax. If no fax signal is present, the second ringing signal is routed to the external phone.

9 Claims, 2 Drawing Sheets

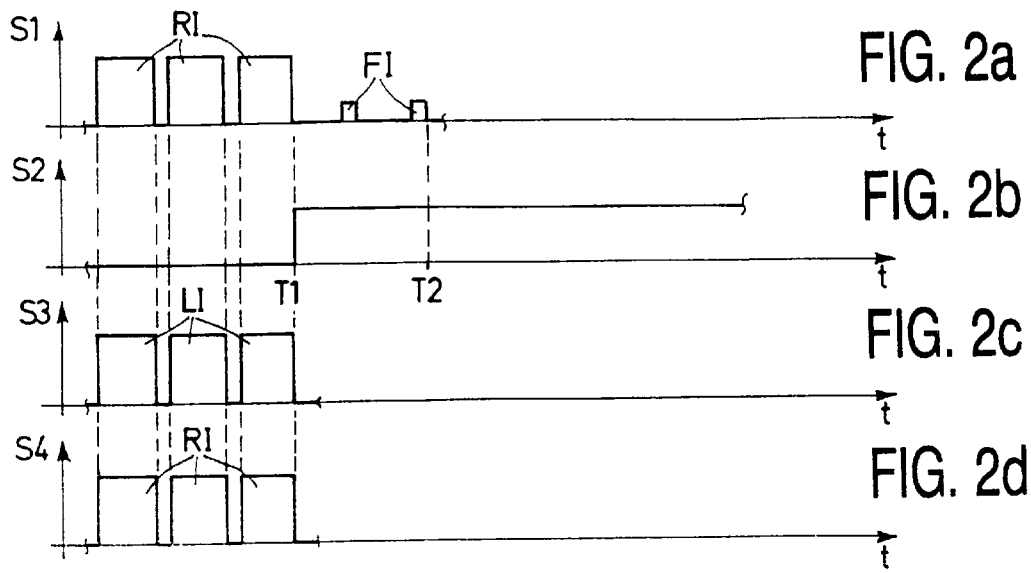
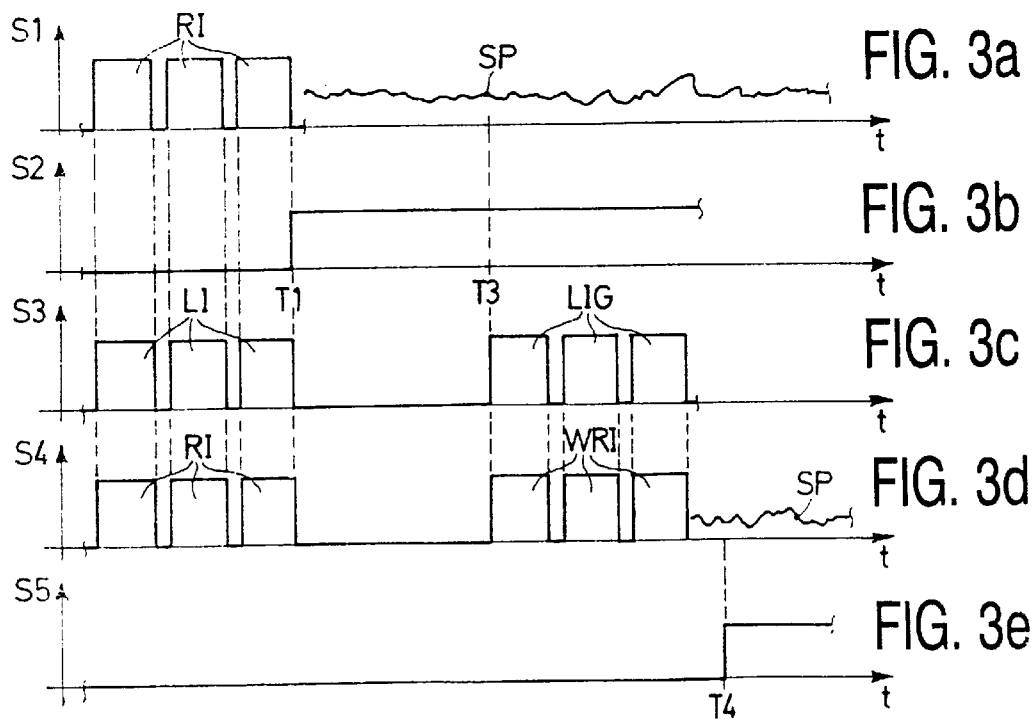

6,005,924

COMBINATION DEVICE INCLUDING FAX MEANS AND TELEPHONE MEANS AND INCLUDING AN ACTIVE FAX SWITCH

BACKGROUND OF THE INVENTION

1. Field of the Invention

The invention relates to a combination device comprising an input terminal to which a telephone line can be connected and on which the combination device can receive an input signal formed by a call signal made up of call signal pulses and, subsequently, an information signal or a fax signal, and comprising fax means adapted to process a received fax signal, and comprising internal telephone means adapted to process a received information signal and to supply a first activation signal for activating a receiving mode of the combination device, to which telephone means an information signal received in the receiving mode can be applied in order to process this signal, and comprising an output terminal via which external telephone means can be connected to the combination device, and comprising call signal processing means connected to the input terminal and arranged to receive an input signal in a standby mode of the combination device and adapted to detect call signal applied to the combination device before an information signal or before a fax signal, which call signal processing means include an electroacoustic transducer for producing an acoustic ringing signal after detection of a call signal pulse of the call signal and are adapted to supply a second activation signal after the occurrence of a given number of call signal pulses in order activate the receiving mode, and which are adapted to produce acoustic ringing signals by means of the electroacoustic transducer in the absence of fax signal detection information in the receiving mode, and comprising fax signal detection means arranged to receive an input signal in the receiving mode and adapted to supply the fax signal detection information when the input signal is a fax signal, and comprising first switching means arranged to receive an input signal from the input terminal in the receiving mode and adapted to supply an input signal from a first output terminal of the first fax means to the fax means when fax signal detection information occurs and to supply an input signal from a second output terminal of the first switching means to the internal telephone means in the absence of a fax signal detection information.

2. Description of the Related Art

Such a combination device of the type defined in the opening paragraph is commercially available from the Applicant under the type designation HFC 8 and is consequently known. In this known combination device both the internal telephone means and the fax means, which are accommodated in a common housing, have an electrical construction as known per se from the apparatuses when they are each accommodated in a separate housing, i.e. from a separate telephone set and a separate fax apparatus. In addition, the known combination device includes a fax switch, which in the present case includes the call signal processing means, the fax signal detection means and the first switching means. In the standby mode of the known combination device the fax switch connects the input terminal of the known combination device to the output terminal of the known combination device, which output terminal can be connected to external telephone means, which may be formed by a so-called cordless telephone. When an input signal formed by a call signal is applied to the input terminal of the combination device the call signal is detected by the call signal processing means of the combination device, a loudspeaker provided as an electroacoustic transducer of the combination device producing an acoustic ringing signal, and is also detected by a further call signal processing stage provided in the external telephone means, as a result of which a further acoustic ringing signal is produced by a further loudspeaker of the external telephone means. In this standby mode the user of the combination device can lift the receiver of the external telephone means or the receiver of the internal telephone means, which lifting is detected by the telephone exchange which is connected to the combination device via the telephone line, upon which a generator stage provided in the telephone exchange to generate the call signal terminates the supply of the call signal, after which the speech signal as an information signal or the fax signal from the other subscriber is supplied to the combination device via the telephone line as the input signal for the combination device.

When in the standby mode of the known combination device the call signal processing means has detected a given number of call signal pulses in the call signal it activates the receiving mode of the combination device, which is detected by the telephone exchange which in response thereto supplies a speech signal or a fax signal from the other subscriber to the input terminal of the combination device. As a result of the activation of the receiving mode the above-mentioned connection between the input terminal and the output terminal of the combination device established in the standby mode is interrupted. Subsequently, the fax signal detection means check whether the input signal is a fax signal. If the input signal is a fax signal the known fax switch connects the input terminal to the fax means, upon which the fax means produce a fax message corresponding to the received fax signal on a record carrier formed by a paper sheet. When the fax signal detection means do not detect a fax signal and the input signal is consequently a speech signal, the call signal processing means are adapted to again produce acoustic ringing signals by means of the loudspeaker. Unfortunately, the known combination device has the problem that in the receiving mode, when the fax signal detection means have not detected a fax signal and the input signal is consequently a speech signal, the external telephone means cannot produce an acoustic ringing signal and it is therefore not possible to answer a telephone call with the external telephone means.

SUMMARY OF THE INVENTION

It is an object of the invention to preclude the aforementioned problems and to provide an improved combination device of the type defined in the opening paragraph in a simple manner and with only a small outlay. According to the invention, in that the combination device has second switching means arranged between the first switching means and the output terminal of the combination device, and there has been provided a generator stage adapted to supply a further call signal to the second switching means, and in the standby mode of the combination device and in the absence of fax signal detection information the second switching means are adapted to supply the further call signal to the output terminal in the receiving mode of the combination device, and there has been provided an activation detector adapted to detect, in the standby mode of the combination device and in the absence of fax signal detection information, the activation of a telephone mode of the external telephone means and to supply a third activation signal in the receiving mode of the combination device, and when a third activation signal is available the first switching means are adapted to supply an input signal to the second switching means via a fourth output terminal of the first switching means, and when a third activation signal is available the second switching means are adapted to supply an input signal to the output terminal. Thus, it is achieved that in the receiving mode of the combination device the generator stage of the combination device supplies a further call signal to the output terminal via the second switching means, as a result of which telephone means connected to the output terminal produce acoustic ringing signals and thus attract the attention of a user to an incoming telephone call. When the user subsequently sets the external telephone means to the telephone mode the activation detector detects the activation of the telephone mode of the external telephone means, upon which the first switching means in conjunction with the second switching means transfer the input signal to the output terminal, which has the advantage that also in the receiving mode of the combination device it is possible to answer a call with the aid of the external telephone means.

It is to be noted that a so-called active fax switch is commercially available, which can receive a call signal and subsequently a speech signal or a fax signal from a telephone exchange on its input terminal and which is adapted to transfer a speech signal to its telephone output and to transfer a fax signal to its fax output. In order to connect a know combination device having fax means and having internal telephone means as well as external telephone means, which can be connected to this device, to the known active fax switch the input terminal of the known combination device should be connected to the fax output and the external telephone means should be connected to the telephone output. When a call characterized by a call signal is received on the input terminal of the active fax switch the active fax switch simulates a receiving made after the occurrence of a given number of call signal pulses, upon which the telephone exchange applies the speech signal or the fax signal from the other subscriber to the input terminal of the active fax switch. Subsequently, the fax signal detection means of the active fax switch check whether a fax signal is present and, if this is the case, they transfer this fax signal to the fax output and thus to the known combination device. However, subsequently, the known combination device again ascertains the presence of a fax signal, which may lead to substantial time delays in establishing the connection for the transmission of the fax signal from the telephone exchange to the fax means. These time delays can become so long that this results in the telephone connection being interrupted by a calling fax apparatus. Another disadvantage arises in that only fax signals are transferred to the input terminal of the known combination device, so that unfortunately the internal telephone means cannot be used at all. Moreover, it has proved to be unfavorable that in the case of the known active fax switch an incoming telephone call cannot be transferred from the external telephone means to the internal telephone means and vice versa.

In a combination device in accordance with the invention, it has proved to be advantageous if, in addition, there are provided memory means in which desired-value information representing a desired number of call signal pulses can be stored, and the call signal processing means are adapted to count the number of call signal pulses in a call signal and to supply actual-value information representing the count, and the call signal processing means include a comparator stage adapted to compare the actual-value information with the desired-value information and to supply the second activation signal when the actual-value information corresponds to the desired-value information. This has the advantage that the number of acoustic ringing signals of the combination device, for testing whether the input signal is a fax signal with the aid of the fax signal detection means, can be set by a user of the combination device. Thus, a user of the combination device, who often receives fax messages, can set the combination device in such a manner that it rings only a few times before the fax signal detection means start to check an input signal and process this in the case of a fax signal, and does not produce any more acoustic ringing signals. Conversely, a user of the combination device, who rarely receives any fax signals, can opt to have the input signal checked by the fax signal detection means only after several acoustic ringing signals.

In a combination device in accordance with the invention, it has proved to be advantageous if, in addition, the combination device can be set to a silent receiving mode in which the desired-value information stored in the memory means is such that the generation of an acoustic ringing signal by the call signal processing means and the supply of a call signal to the output terminal in the standby mode is inhibited. Thus, it is achieved that the combination device already starts the check of the input signals by the fax signal detection means after the first call signal pulse, which call signal pulse does not produce an acoustic ringing signal, as a result of which in a silent receiving mode a fax signal is printed as a fax message by the fax means without the combination device producing an acoustic ringing signal. This is particularly advantageous for the reception of fax signals during the night time. The desired-value information to be stored in the memory means for the silent mode can be the digit "0" or the digit "1", depending on the initial value of the actual-value information in the call signal processing means.

In a combination device in accordance with the invention, it has further proved to be advantageous if, combination detection means connected to a keypad of the combination device and the fourth output terminal of the first switching means and arranged to receive at least one item of identification information from the keypad or the fourth output terminal of the first switching means, which key combination detection means are adapted to detect at least one item of identification information applied to them and control the first switching means in dependence upon the detected identification information. This has the advantage that a telephone conversation conducted with the external telephone means upon activation of a telephone mode of the external telephone means can be routed from the external telephone means to the internal telephone means or the fax means by actuation of a key or a given key combination on the external telephone means. Likewise, a telephone conversation conducted with the aid of the internal telephone means upon activation of the telephone mode of the internal telephone means can be routed from the internal telephone means to the external telephone means and the fax means through actuation of a key or key combination of the internal telephone means.

In a combination device in accordance with the invention, it has further proved to be advantageous if, in the stanby mode of the combination device the activation detector is adapted to detect the activation of a telephone mode of the external telephone means and subsequently to supply the third activation signal, and the first switching means and the second switching meand are adapted to supply a speech signal from the internal telephone means to the output terminal of the combination device when a first activation signal and a third activation signal are available. In the standby mode of the combination device this makes it possible to make calls known as intercom calls between the internal telephone means and the external telephone means.

The afore-mentioned aspects as well as further aspects of the invention will be apparent from the embodiment described hereinafter by way of example and will be elucidated on the basis of this embodiment.

BRIEF DESCRIPTION OF THE DRAWING

The invention will now be described in more detail with reference to an embodiment shown in the Figures and given by way of example, but to which the invention is not limited.

FIGS. 2a–2d show waveform diagrams of signals which appear in the combination device of FIG. 1 when the combination device receives a fax signal on an input terminal of the combination device.

FIGS. 3a–3e show waveform diagrams of signals which appear in the combination device when the combination device receives a speech signal on the input terminal of the combination device.

DETAILED DESCRIPTION OF THE INVENTION

Figure 1:
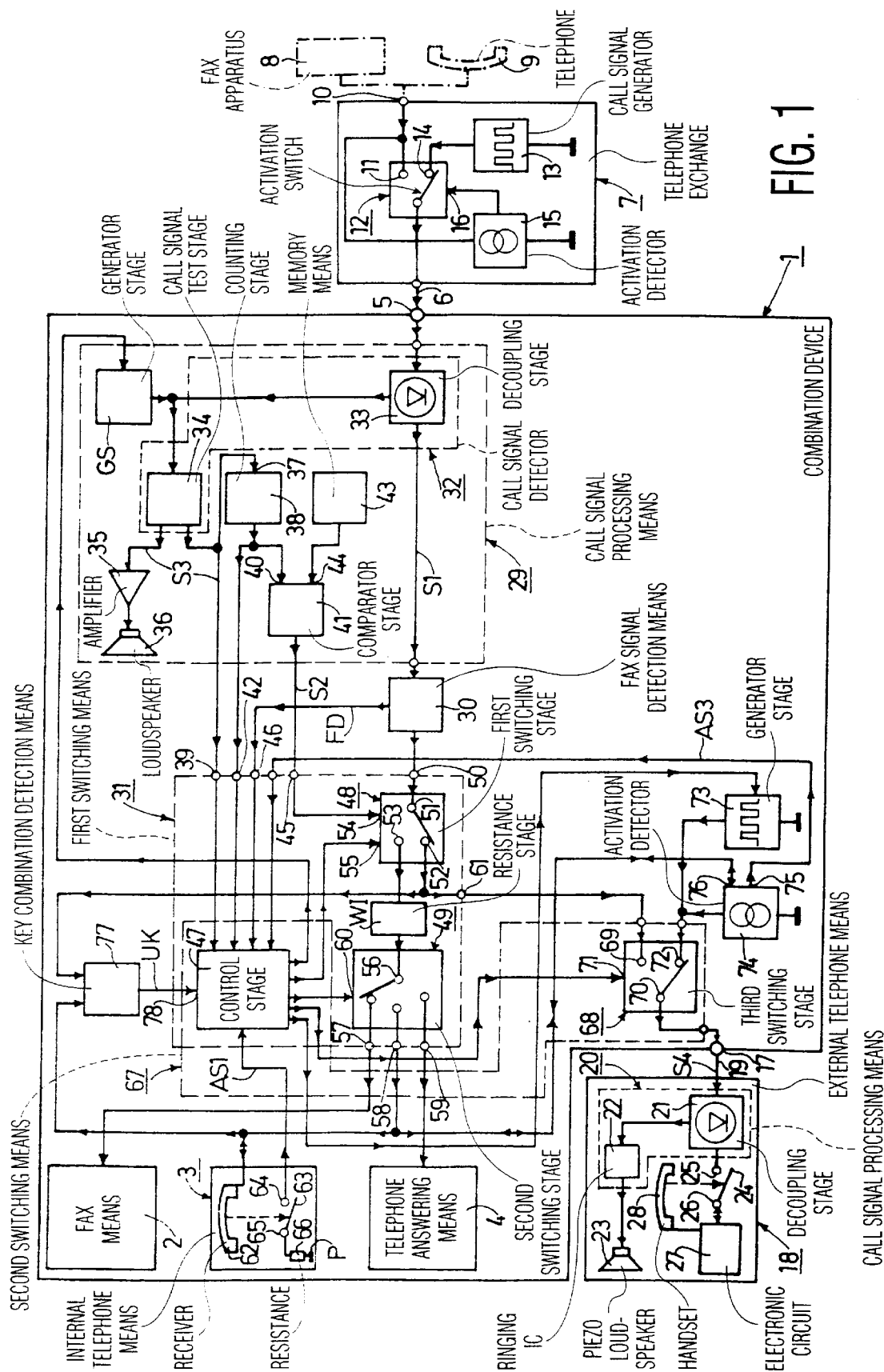
FIG. 1 is a block diagram which shows diagrammatically a combination device in accordance with the invention, which includes fax means, internal telephone means and telephone answering means and to which external telephone means can be connected.

FIG. 1 shows a combination device 1 including fax means 2, internal telephone means 3, and telephone-answering means 4. The combination device 1 further has an input terminal 5, to which a telephone line 6 can be connected and on which the combination device 1 can receive an input signal S1 formed by a call signal (see FIG. 2, part A) made up of call signal pulses RI and, subsequently, an information signal or a fax signal from a telephone exchange 7, shown highly diagrammatically in FIG. 1 and connected to the telephone line 6.

On an input 10 the telephone exchange 7 can receive a fax signal (see FIG. 2, part A) from another fax apparatus 8 of another subscriber, or an information signal, formed by a speech signal SP (see FIG. 3, part A and part D), from another telephone 9 of caller. The information signal received on the input 10 of the telephone exchange 7 can also be a data signal. The input 10 of the telephone exchange 7 is connected to a first input 11 of an activation switch 12. The telephone means 7 further comprises a call signal generator 13 for generating a call signal and for applying the generated call signal to a second input 14 of the activation switch 12. The telephone means 7 further comprises an activation detector 15, which forms a so-called line current generator and is consequently adapted to generate a so-called line current and to supply the line current to the first input 11 of the activation switch 12, and which also forms a detector for detecting a receiving mode of the combination device 1, which detects an activation of the receiving mode in the combination device 1 on the basis of a change of the line current consumed by the combination device 1 and in the present case is further adapted to supply a control signal to a control input 16 of the activation switch 12 in order to change the switching state of the activation switch 12. Depending on the activated switching state of the activation switch 12 a fax signal or speech signal applied to the input to the input 11, with superposed line current, can be supplied to the input terminal 5 of the combination device 1, or the call signal applied to the second input 14 of the activation switch 12 can be supplied to the input terminal 5 of the combination device 1.

The combination device 1 further has an output terminal 17, to which the external telephone means 18, in the present case a separate telephone set, are connected via a further telephone line 19. It is to be noted that the external telephone means 18 can alternatively be formed by a so-called cordless telephone. The external telephone means 18 include call signal processing means 20 formed by a decoupling stage 21 and a ringing IC 22. An input signal S1 supplied to the output terminal 17 of the combination device 1 can be applied to the decoupling stage 21 of the external telephone means 18 via the further telephone line 19. The decoupling stage 21 is adapted to supply an electrically decoupled input signal corresponding to the applied input signal S1 to the ringing IC 22, which ringing IC 22 can supply a plurality of ringing pulses and is energized, by means of the electrically decoupled input signal, with a supply voltage for operating the ringing IC 22. The ringing IC 22 is adapted to supply ringing pulses to a piezo-loudspeaker 28, which forms an electroacoustic transducer adapted to produce and emit an acoustic ringing tone. The external telephone means 18 comprise a hookswitch 24 having a first terminal 25 and a second terminal 26, the first terminal 25 being arranged to receive the input signal from the output terminal 17 via the further telephone line 19 and the decoupling stage 21. The second terminal 26 of the hookswitch 24 is connected to an electronic circuit 27, which defines the functionality of the external telephone means 18, as is generally known. A handset 28 is connected to the electronic circuit 27 and, when the hookswitch 24 is closed, i.e. when the receiver is off the hook, the input signal S1 can be applied from the first terminal 25 of the hookswitch 24 to the receiver 28 via the second terminal 26 of the hookswitch 24 and the electronic circuit 27. It is to be noted that the electronic circuit 27 has an electrical input resistance of approximately 600 ohms, which is presented to the output terminal 17 of the combination device 1 when the receiver 28 is off the hook and, consequently, a telephone mode of the external telephone means 18 is active.

The combination device 1 further comprises call signal processing means 29, fax signal detection means 30 and first switching means 31. The call signal processing means 29 comprise a call signal detector 32 formed by a decoupling stage 33 and a call signal test stage 34. The decoupling stage 33, which in the present case is formed by a so-called optocoupler, is arranged to receive the input signal S1 from the input terminal 5 of the combination device 1. The decoupling stage 33 is adapted to apply an input signal to the call signal test stage 34, which input signal corresponds to the input signal S1 but is electrically decoupled from the input signal S1. The call signal test stage 34 is adapted to check whether an electrically decoupled input signal includes a call signal pulse RI and to supply a ringing pulse LI to an amplifier 35 of the call signal processing means 29 for each detected call signal pulse RI, which ringing pulse LI functionally corresponds to a call signal pulse RI but has a substantially smaller amplitude. The call signal processing means 29 further include a loudspeaker 36, which forms an electroacoustic transducer and which is arranged to receive an amplified ringing signal from the amplifier 35 in order to produce an acoustic ringing tone for each call signal pulse RI of the call signal. The call signal test stage 34 can further supply the ringing pulses LI to an input 37 of a counting stage 38 and to an input 39 of the first switching means 31.

The counting stage 38 is adapted to count the number of ringing pulses LI, which correspond to the number of ringing signal pulses RI, and to apply actual-value information II, which represents the count, to an input 40 of a comparator stage 41 included in the call signal processing means 29 and to an input 42 of the first switching means 31. The call signal processing means 29 further include memory means 43, which are formed by an EEPROM and which, in a manner not shown, can store desired-value information SI representing a desired number of call signal pulses RI, which stored desired-value information SI can be applied to a further input 44 of the comparator stage 41. The comparator stage 41 is adapted to compare the actual-value information II with the desired-value information SI and to supply a second activation signal S2 to a further input 45 of the first switching means 31 if the actual-value information II corresponds to the desired-value information SI.

The input signal S1 of the combination device 1 can be applied from the input terminal 5 to the fax signal detection means 30 via the decoupling stage 33 of the call signal detector 32. A fax signal includes fax signal identification information, defined by fax signal identification pulses FI, also known as CNG signals (FIG. 2, part A), which fax signal identification pulses FI have a pulse duration of approximately half a second with a clock frequency of one kilohertz. Two fax signal identification pulses FI are separated by a pulse spacing of approximately three seconds. The fax signal detection means 30 recognize an input signal S1 of the combination device 1 as a fax signal if two fax signal identification pulses FI separated by an appropriate pulse spacing are detected and in the present case these means are adapted to supply fax signal detection information FD to a further input 46 of the first switching means 31. The fax signal detection means 30 are further adapted to detect the absence of a line current superposed on the input signal and to detect a busy signal from the telephone exchange 7. If absence of a line current in the input signal or the presence of a 5 busy signal is detected the fax signal detection means are adapted to terminate the receiving mode of the combination device 1 and to activate the standby mode of the combination device 1 in a manner not shown in FIG. 1.

The first switching means 31 comprise a part of a control stage 47, formed by a microprocessor, a first switching stage 48 and a second switching stage 49. The input signal S1 can be applied from the input terminal 5 of the combination device 1 to a first input 50 of the first switching means 31 via the call signal detector 32 and the fax signal detection means 30. The input signal S1 can be applied from the input 50 of the first switching means 31 to an input 51 of the first switching stage 48 and, in a first switching state of the first switching stage 48, from said input to a first output 52 and, in a second switching state, to a second output 53 of the first switching stage 48. The first switching stage 48 further has a first control input 54 connected to the input 45 of the first switching means 31 and is arranged to receive the second activation signal S2 from the comparator stage 41 of the call signal processing means 29 in order to change the switching state of the first switching stage 48. The first switching stage 48 further has a second control input 55 arranged to receive a control signal from the control stage 47 in order to change the switching state of the first switching stage 48.

The second switching stage 49 has an input 56 arranged to receive the input signal S1 of the combination device 1 via a resistance stage WI when the first switching stage 48 is in its second switching state and the input 51 is connected to the second output 53. The resistance stage WI has an input resistance of approximately 600 ohms and forms the input resistance of the combination device 1, which will be elucidated hereinafter.

The second switching stage 49 has three switching states and an input signal S1 appearing on the input 56 can be transferred to a first output terminal 57 of the first switching means 32 in a first switching state of this stage, to a second output terminal 58 of these means in a second switching state of this stage, and to a third output terminal 59 of these means in a third switching state of this stage. The second switching stage 49 further has a control input 60 via which the second switching stage 49 can receive a control signal from the control stage 47 in order to change its switching state. The part of the control stage 47 included in the first switching means 31 is adapted to supply control information to the second control input 55 to change the switching state of the first switching stage 48 and to supply control information to the control input 60 of the second switching stage 49 to change the switching state of the second switching stage 49 in dependence upon signals and information applied to the inputs of the control stage 47, as will be described in more detail hereinafter. The first output 52 of the first switching stage 48 is connected to a fourth output terminal 61 of the first switching means 31.

In a manner not illustrated in FIG. 1, the fax means 2 include means for receiving a fax signal and for printing a fax message corresponding to the fax signal on a paper record carrier, as is generally known. When the first switching stage 48 is in its second switching state and the second switching stage 49 is in its first switching state, an input signal S1 formed by a fax signal can be transferred from the output terminal 57 of the first switching means 31 to the fax means 2.

When the first switching stage 48 is in its second switching state and the second switching stage 49 is in its second switching state an information signal, which can be formed by a speech signal, can be transferred from the second output terminal 58 of the first switching means 31 as an input signal SI to a receiver 62 of the internal telephone means 3. The internal telephone means 3 further include a hookswitch 63 having a first terminal 64 and s second terminal 65. The second terminal 65 is connected to a potential P via a resistance 66. When the receiver 62 of the internal telephone means 3 is taken off the hookswitch 63 in order to answer a call, the hookswitch 63 connects the first terminal 64 to the potential P via the second terminal 65 and the resistance 66, so that a first activation signal AS1 is applied from the first terminal 64 to the control stage 47 of the first switching means 31, as a result of which the control stage 47 is adapted to set the first switching stage 48 to its second switching state and to set the second switching stage 49 to its second switching state, on account of which the input signal SI is transferred from the input terminal 5 to the receiver 61 of the internal telephone means 3.

When the first switching stage 48 is in its second switching state and the second switching stage 49 is in its third switching state an input signal S1 can be transferred from the input terminal 5 of the combination device 1 to the telephone-answering means 4 via the third output terminal 59. The telephone-answering means 4 are adapted to record the input signal S1, in a manner not shown in FIG. 1, on a record carrier in the form of a digital memory, as is known.

The combination device 1 includes second switching means 67, which are formed by a third switching stage 68 and by a part of the control stage 47. The third switching stage 68 has a first input 69 connected to the fourth output terminal 61 of the third switching means 31. The third switching stage 68 has a second output 70 connected to the output terminal 17 of the combination device 1, so that the second switching means 67 are arranged between the first switching means 31 and the output terminal 17. The third switching stage 68 has a control input 71 by means of which control information for controlling the switching state of the third switching stage 68 can be applied to the third switching stage 68. The third switching stage 68 has a second input 72. The combination device 1 comprises a further generator stage 73 adapted to supply a further call signal to the second input 72 of the third switching stage 68 of the second switching means 67 upon reception of appropriate control information from the control stage. The combination device 1 further comprises an activation detector 74, in the present case formed by a so-called line current generator, which activation detector 74 is adapted to supply a line current to the second input 72 of the third switching stage 68. The activation detector 74 further has a detector output 75 to which a third activation signal AS3 for the control stage 47 is supplied when the activation detector 74 detects a change of the line current while the third switching stage 68 is in its second switching state as a result of the receiver 28 being taken off the hook and the hookswitch 24 being closed.

The activation 74 further has a terminal 76 connected to the receiver 62 of the internal telephone means 3 and via which a telephone call can be made between the internal telephone means 3 and the external telephone means 18 in an internal telephone mode, known as the intercom mode, which will be described in more detail hereinafter.

The combination device 1 further has key combination detection means 77 connected to the receiver 67 of the internal telephone means 3 and to the first input 69 of the third switching stage 68. The key combination detection means 77 serve for detecting identification information, which identification information can be entered by a telephone keypad, not shown in FIG. 1, of the internal telephone means 3 or a telephone keypad, not shown in FIG. 1, of the external telephone means 18 in order to transfer a telephone call. For this, identification information for the individual keys is modulated onto the speech signal. It is to be noted that identification information from the telephone keypad of the internal telephone means 3 can also be applied directly to the control stage 74 in non-modulated form. The key combination detection means 77 are adapted to detect such identification information and to supply identification information UK to an input of the part of the control stage 47 which is included in the first switching means 31. The key combination detection means 77 are detected to control the switching states of the first switching stage 48 and the second switching stage 49 and the switching state of the third switching stage 68 in dependence upon the identification information UK.

The call signal processing means 29 further include a generator stage GS which is adapted to supply a call signal to the call signal test stage 34 in response to control information from the control stage 47.

It is to be noted that in the combination device 1 standby mode is active if no information signal or fax signal is transmitted between, on the one hand, the other fax apparatus 8 or the other telephone means 9 and, on the other hand, the fax means 2 or the internal telephone means 3 or the telephone-answering means 4 or the external telephone means 18 via the telephone exchange 7, for which reason the combination device 1 is adapted to receive an input signal in the standby mode. However, when an information signal or fax signal is transmitted between, on the one hand, the other fax apparatus 8 or the other telephone means 9 and, on the other hand, the fax means 2 or the internal telephone means 3 or the telephone-answering means 4 or the external telephone means 18 via the telephone exchange 7, the combination device 1 is set to an receiving mode.

Hereinafter, the operation of the combination device 1, the external telephone means 18 and the telephone exchange 7 will now be described in more detail for the situation in which a fax signal for the combination device 1 is applied from the other fax apparatus 8 to the input 10 of the telephone exchange 7. The telephone exchange 7 is then adapted to supply a call signal with call signal pulses RI, shown in part A of FIG. 2, to the second input 14 of the activation switch 12. Moreover, a line current is supplied from the activation detector 15 to the first input 11 in this situation. In a manner not shown in FIG. 1, the telephone exchange 7 is then adapted to change the switching state of the activation switch 12 in such a manner that during the pulses durations of the call signal pulses RI generated by the call signal generator 13 call signal pulses RI are applied to the input terminal 5 of the combination device 1 via the second input 14 and that during the pulse spacings of the call signal pulses RI the line current is applied as an input signal S1 to the input terminal 5 of the combination device 1 via the first input 11 of the activation switch 12.

The input signal S1 applied to the input terminal 5 of the combination device 1 is transferred to the decoupling stage 33, which supplies an electrically decoupled input signal both to the call signal test stage 34 and to the counting stage 38. The call signal test stage 34 detects a call signal pulse RI in the electrically decoupled input signal S1 on the basis of its amplitude, which should be of the order of magnitude of 100 V, and on the basis of its frequency, which should be approximately 50 Hz. When the call signal test stage 34 detects a call signal pulse RI in the electrically decoupled input signal S1 and when the combination device 1 is in the standby mode, a ringing pulse LI is applied from the call signal test stage 34 to the loudspeaker 36 via the amplifier 35, which loudspeaker then emits an acoustic ringing tone. The ringing duration of the acoustic ringing tone corresponds to the pulse duration of a call signal pulse RI.

In the standby mode the first switching means 31 are adapted to supply control information to the second control input 55 of the first switching stage 48, as a result of which the first switching stage is set to its first switching state in which the input 51 is connected to the first output 52. In the standby mode, when the control stage 47 has received a ringing pulse LI from the call signal test stage 34, the control stage 47 is adapted to supply control information to the control input 71 of the third switching stage, as a result of which the second input 72 is connected to the output 70. In this situation the switching stage 48 is further adapted to supply control information to the further generator 73, upon which this generator supplies a call signal to the second input 72 of the third switching stage 68. In the standby mode of the combination device 1, when the call signal test stage 34 has detected a call signal pulse RI, an input signal S1 formed by the call signal from the further generator 73 and the superposed line current from the activation detector 74 is supplied to the output terminal 17 of the combination device 1. The input signal SI, which is shown in part D of FIG. 2, supplied to the output terminal 17 of the combination device 1 can be applied to the decoupling stage 21 and a corresponding electrically decoupled input signal can be applied to the ringing IC 22, which ringing IC 22 supplies a ringing pulse to the piezo-loudspeaker 23 for each call signal pulse detected in the electrically decoupled input signal, which loudspeaker then emits an acoustic ringing tone.

Thus, it is achieved that in the standby mode of the combination device 1, when an input signal S1 comprising one or more call signal pulses is applied to the input terminal 5, the loudspeaker 36 in the combination device 1 and the piezo-loudspeaker 23 in the external telephone means 18 produce acoustic ringing tones and enable a user of the combination device 1 to receive a speech signal or data signal at the internal telephone means 3 by picking up the receiver 62 or at the external telephone means 18 by picking up the receiver 28.

Hereinafter, it will now be assumed that the user of the combination device 1 picks up neither the receiver 62 nor the receiver 28. A ringing pulse LI generated by the call signal test stage 34 is supplied from the call signal test stage 34 to the input 37 of the counting stage 38. The count of the ringing pulses LI in the counting stage 38 is each time reset to zero at the end of a call, i.e. at the change from the receiving mode to the standby mode of the combination device 1. Consequently, when the call signal pulses RI shown in part A of FIG. 2 appear, which pulses give rise to ringing pulses LI, the counting stage 38 again begins to count until after the occurrence of the third call signal pulse RI shown in part A of FIG. 2 count of the call signal pulses in the counting stage 38 is "3" and actual-value information II representing the count is applied to the comparator stage 41. As already described hereinbefore, the number "3" has been defined as the desired number of call signal pulses RI and desired-value information SI representing this number "3" has been stored in the memory means 43, which desired-value information is applied to the comparator stage 41. Thus, at an instant T1 the comparator stage 41 detects that the actual-value information II corresponds to the desired-value information SI and supplies a second activation signal S2 shown in part B of FIG. 2 to the first control input of the first switching stage 48. When the second activation signal S2 appears the switching state of the first switching stage 48 is changed and the input 51 is connected to the second output 53 of this stage, as a result of which the resistance stage WI is connected to the input terminal 5, so that the combination device 1 now has an input resistance of approximately 600 ohms.

The activation detector 15 of the telephone exchange 7 detects line current change, which is caused by a change of the input resistance of the combination device 1, as a result of which the activation detector 15 supplies control information to the control input 16 of the activation switch 12 and connects the first input 11 permanently to the input terminal 5 of the combination device 1 and, in a manner not shown in the Figure, now transfers the fax signal from the input 10 of the telephone exchange 7 to the input terminal 5 via the first input 11 of the activation switch 12. The combination device 1 is now in the receiving mode, in which it is adapted to receive the input signal, which in the present case is formed by a fax signal from the other fax means 8.

In the receiving mode the input signal S1 can be applied to the fax signal detection means 30, which detects the presence of fax signal identification pulses FI in the input signal S1. As already described hereinbefore, the fax signal detection means 30 identify an input signal S1 of the combination device 1 as a fax signal when two fax signal identification pulses FI are detected. At an instant T2 the fax signal detection means 30 have identified the input signal S1 as a fax signal and supply fax signal detection information FD to the control stage 47 via the input 46 of the first switching means 31. The control stage 47 is adapted to supply control information to the control input 60 of the second switching stage 49 to set the second switching stage 49 to its first switching state, as a result of which the input 56 is connected to the first output terminal 57. The fax signal is now applied to fax means 2 via the input 10 of the telephone exchange 7, the input terminal 5 of the combination device 1, the decoupling stage 33, the fax signal detection means 30, the first switching stage 48, the resistance stage WI and the second switching stage 49. The fax means 2 are now adapted to acknowledge the existing connection to the other fax means 8, which subsequently transmit the actual fax message, which is received in the fax means 2 and is printed out on paper, as is generally known.

Hereinafter, the situation is described that the other telephone 9 a speech signal from a caller is applied to the input 10 of the telephone exchange 7. The telephone exchange 7—as already described—is then adapted to supply a call signal to the input terminal 5 for the pulse duration of the call pulse and to supply a line current to the input terminal 5 during the pulse spacings of the call signal. The occurrence of a call signal in the input signal of the combination device 1, which has been set to its standby mode, results in acoustic ringing tones being produced by the loudspeaker 36 and acoustic ringing tones being produced by the piezo-loudspeaker 23 of the external telephone means 18. After the occurrence of two call signal pulses RI, i.e. before a second activation signal S2 is supplied in the case of agreement of the desired-value information SI with the actual-value information II, the receiver 28 of the external telephone means 18 is lifted off the hookswitch. As a result of the closure of the hookswitch 24 the electronic circuit 27 is connected to the output terminal 17 of the combination device 1, which causes the input resistance of the combination device 1 to be changed. This change of the input resistance can be detected by a change of the range current from the activation detector 74, which supplies detection information to the control stage 47 via the output 75, which stage subsequently supplies control information to the control input of the third control stage 68, as a result of which the first input 69 is connected to the output 70. Thus, a connection exists from the input terminal 5 to the electronic circuit 27 of the external telephone means 18, as a result of which the input resistance of the information combination device changes. This change of the input resistance is detected by the activation detector 15 of the telephone exchange, which now permanently applies the speech signal 11 from the other telephone 9 to the receiver 28, so that the combination device 1 is set to the receiving mode. When the user of the external telephone means 18 puts replaces the receiver 28 when the call has ended, the activation detector 15 can detect that no line current flows, as a result of which the telephone connection is interrupted and the combination device 1 is again set to the standby mode.

Now the situation is described that a speech signal supplied by the other telephone 9 of a caller is received by the internal telephone means 3 after the occurrence of two call signal pulses, i.e. after two ringing tones have been produced by the loudspeaker 36 and the piezo-loudspeaker 23, in that the receiver 62 is picked up. When the receiver 62 of the internal telephone means 3 is picked up and the hookswitch 63 is closed, a first activation signal AS1 is supplied to the control stage 47. When a first activation signal AS1 appears the control stage 47 is adapted to supply control information to the second control input 55 of the first switching stage 48 so as to connect the input 51 to the second output 53 and to supply further control information to the control input 60 of the second control stage 49 so as to connect the input 56 to the second output terminal 58. Since the resistance stage WI is connected to the input terminal 5 of the combination device 1, the input resistance of the device changes, which resistance change is detected through the change of the line current from the activation detector 15 of the telephone exchange 7. The telephone exchange 7 now permanently connects the other telephone 9 to the input terminal 5 via the activation switch 12, which input terminal is already connected to the receiver 62 of the internal telephone means 3, as a result of which the combination device 1 is set to the receiving mode. After termination of the telephone call the combination device 1 is again set to the standby mode, as described hereinbefore.

Hereinafter, the situation is described that a speech signal from a caller at the other telephone means 9 is not answered until the fax signal detection means 30 have checked whether the input signal S1 is a fax signal. The signals which in this case appear in the combination device 1 are shown in FIG. 3. Part A of FIG. 3 shows the input signal S1 which comprises three call signal pulses RI of the call signal supplied by the telephone exchange 7. Starting from the instant T1, the input signal S1 further comprises a speech signal SP from a caller at the other telephone means 9, which speech signal is supplied from the telephone exchange 7 to the input terminal 5 of the combination device 1 upon the supply of a second activation signal S2, shown in part B of FIG. 3, by the comparator stage 41, whereby the combination device 1 is set to the receiving mode. Before the instant T1 part C in FIG. 3 shows three ringing pulses LI which correspond to the call signal pulses RI and which, as already described, result in three times an acoustic ringing tone being emitted by the loudspeaker 36. Part D in FIG. 3 shows three call signal pulses RI from the further generator 74, which appear on the output terminal 17 of the combination device 1 before the instant T1. The fax signal detection means 30 now check for a given time interval from the instant T1 until an instant T3 whether the input signal includes fax signal identification pulses FI and is consequently a fax signal. Since the fax signal detection means 30 have not detected any fax signal identification pulses FI in the time interval from the instant T1 until the instant T3, the fax signal detection means 30 do not supply any fax signal detection information FD. In the absence of fax signal detection information the control stage 47 of the first switching means 31 are adapted to supply control information to the generator stage GS, which supplies an artificial call signal similar to a regular call signal to the call signal test stage 34 when this control information appears. The call signal test stage 34 subsequently supplies ringing pulses LIG, which are shown in FIG. 3. The ringing pulses LIG are reproduced as acoustic ringing tones by the loudspeaker 36, so that also after the fax signal detection means 30 have checked whether a fax signal is received the combination device 1 is capable of producing an acoustic ringing signal.

Advantageously, the control stage 47 is now adapted to supply control information to the control input 71 of the third control stage 68, which causes the switching state of the third control stage 68 to be changed and the second input 72 to be connected to the output 70 of the third control stage 68. Subsequently, a call signal, which is supplied by the further generator stage 73 and includes call signal pulses WRI, together with a line current superposed by the activation detector 74 is applied to the output terminal 17. The call signal pulses WRI applied to the output terminal 17 are electrically decoupled by the decoupling stage 21 of the external telephone means 18 and—as already described hereinbefore—result in acoustic ringing tones being produced. This has the advantage that in the receiving mode of the combination device 1 the further generator stage 73 of the combination device 1 supplies a further call signal to the output terminal 17 via the second switching means 67, as a result of which external telephone means 18 connected to the output terminal 17 produce acoustic ringing signals and thus draw the user's attention to an incoming telephone call. If the user now takes the receiver 28 from the hookswitch 24 the electronic circuit 27 is connected to the output terminal 17 of the combination device 1, the activation detector 74 detecting the resulting resistance change through a change in line current, thus detecting the activation of a call mode of the external telephone means 18 and supplying a third activation signal AS3 to the control stage 47. The control stage 47 of the first switching means 31 is adapted to supply control information to the second control input 55 of the first switching stage 48 when a third activation signal AS3 appears, upon which the input 51 remains connected to the first output 52 of the first switching stage 48 and the input signal S1 is supplied to the second switching means 67 via the fourth output terminal 61 of the first switching means 31. The part of the control stage 47 in the second switching means 67 is adapted to supply control information to the control input 71 of the third switching stage 68 when a third activation signal appears, as a result of which the third switching stage 68 connects the first input 69 to the output 70. Consequently, the second switching means 67 are adapted to supply an input signal S1 from the fourth output terminal 61 to the output terminal 17 of the combination device 1 when a third activation signal AS3 is present. Thus, the speech signal from the other telephone means 9 is transferred from the combination device 1 to the output terminal 17 and supplied to the receiver 28 via the closed hookswitch 24 and the electronic circuit 27. This has the advantage that it is also possible to answer a call with the aid of the external telephone means 18 after testing whether a fax signal is received by the fax signal detection means 30.

In a manner not shown in FIG. 1 the combination device 1 can be set to a silent receiving mode, in which the memory means 43 store the number "1" as the desired-value information SI and in which the generation of an acoustic ringing signal by the call signal processing means in the standby mode is inhibited, in spite of the number "1" stored in the memory means 53, which in itself—as described hereinbefore—would result in a non-recurrent generation of an acoustic ringing signal. Thus, it is achieved that if a call signal is applied to the input of the combination device 1 the counting stage 38 does count a first call signal pulse RI and the comparator stage does supply a second activation signal S2, because the memory means store the number "1" as desired-value information SI upon which the combination device 1 is directly set to the receiving mode, but the call signal test stage 34 does not supply a ringing pulse LI and, consequently, the loudspeaker 36 does not produce a ringing tone. Furthermore, the control stage 47 does not supply control information to the further generator 73 to generate a call signal in the silent receiving mode, as a result of which no call signal is supplied to the output terminal 17 and, as a consequence, the external telephone means 18 do not produce a ringing tone.

When the fax signal detection means 30 now detect a fax signal this signal—as already explained hereinbefore—is applied to the fax means 2. Thus, the generation of a ringing signal by the loudspeaker 36 of the combination device 1 and the piezo-loudspeaker 23 of the external telephone means 18 is omitted completely when the silent receiving mode is active and a fax signal is received. However, when a speech signal is received—as already explained hereinbefore—both the loudspeaker 36 and the piezo-loudspeaker of the external telephone means 18 produce acoustic ringing signals in the absence of fax signal detection information FD in the receiving mode.

Advantageously, the combination device 1 is further adapted to transfer a telephone call between the other telephone means 9 and the internal telephone means 3 from the internal telephone means 3 to the external telephone means 18. To this end, the user of the internal telephone means 3 actuates a given combination of keys, not shown in FIG. 1, on the internal telephone means 3, upon which signals corresponding to the relevant keys are modulated onto the speech signals by the internal telephone means 3 and are applied from the receiver 62 to the key combination detection means 77. The key combination detection means 77 are adapted to demodulate the key identification signal modulated onto the speech signal and to detect the sequence of the keys actuated in the telephone means 3. The key combination detection means 77 subsequently supply identification information UK to the input 78 of the control stage 47, which is adapted to change the switching states of the first switching stage 48, of the second switching stage 49 and of the third switching stage 68 in dependence upon the identification information UK, as already explained hereinbefore. Similarly, a telephone call between the other telephone means 9 and the external telephone means 18 can be transferred to the internal telephone means 3 when by actuation of keys, not shown, of the external telephone means 18 identification information is modulated onto the speech signal and is applied to the key combination detection means 77 via the first input 69 of the third switching stage 68. It is likewise possible to transfer a telephone call from the internal telephone means 3 or the external telephone means 18 to the fax means 2.

The combination device 1 further enables so-called intercom operation, in which in the standby mode of the combination device 1 a telephone call is made between the internal telephone means 3 and the external telephone means 18. In the standby mode the third switching stage 68 is in its second switching state, in which the second input 72 is connected to the output 70. When the receiver 28 of the external telephone means 18 is taken off the hookswitch 24, the activation detector 74 detects the changes of the input resistance of the external telephone means 18 and supplies a third activation signal to the control stage 47, as already explained hereinbefore. When in the standby mode the receiver 62 of the internal telephone means 3 is taken off the hookswitch, the internal telephone means 3 supply a first activation signal Al1 to the control stage 47. When the combination device 1 is in its standby mode and the control stage 47 receives a first activation signal Al1 and a third activation signal AS3, the combination device 1 is set to an intercom mode in which it is possible to make a telephone call between the receiver 62 of the internal telephone means 3 and the receiver 28 of the external telephone means 18. A speech signal from the receiver 62 of the internal telephone means 3 then modulates the line current of the activation detector 74, which modulated line current is converted into an acoustic signal in the loudspeaker of the receiver 28. On the other hand, a speech signal from the receiver 28 gives rise to a resistance variation of the input resistance of the external telephone means 18, which results in a voltage variation on the output terminal 17, which voltage variations are transferred to the receiver 62 of the internal telephone means 3 via the third switching stage 68 and the activation detector 74 and converted into acoustic signals in the loudspeaker of the receiver 62. This enables a particularly simple and effective intercom connection to be established between the internal telephone means 3 and the external telephone means 18.

It is to be noted that the second switching stage 49 can be realized by means of the microcomputer which also forms the control stage 47.

We claim:

1. A fax and phone combination device comprising:

fax means for processing a fax signal received by said combination device;

internal phone means for processing an information signal received by said combination device;

call signal processing means for processing a call signal received by said combination device and for producing a first acoustic ringing signal from said call signal, said first acoustic ringing signal being intended for said internal phone means;

an output terminal for coupling said combination device to external phone means;

acoustic ringing signal generating means for generating a second acoustic ringing signal intended for said external phone means;

fax signal detecting means for detecting said fax signal; and switching means coupled to said fax means, said internal phone means, said call signal processing means, and said output terminal;

said call signal, said fax signal, and said information signal being received from a phone line, and said call signal preceding said fax signal or said information signal, said switching means switching said combination device in a simulated receiving mode upon detection of at least one call signal pulse comprised in said call signal, in which simulated receiving mode said fax signal detecting means detect whether said fax signal is present, route said fax signal to said fax means if said fax signal is present, and route said second acoustic ringing signal to said external phone means if no fax signal is present.

2. A fax and phone combination device as claimed in claim 1, further comprising activation detecting means for detecting an off-hook condition of said external phone means, wherein, upon routing of said second acoustic ringing signal to said external telephone means, said switching means switch said output terminal to said phone line when said off-hook condition is detected.

3. A fax and phone combination device as claimed in claim 1, further comprising storage means for storing a preset call signal pulse count, said switching means switching said combination device into said simulated receiving mode when a number of received call signal pulses is equal to said preset call signal pulse count.

4. A fax and phone combination device as claimed in claim 3, wherein said preset call signal pulse count is settable by a user of said combination device.

5. A fax and phone combination device as claimed in claim 3, wherein said present call signal pulse count is set to minimum so as to cause suppression of said first acoustic ringing signal before said switching means switch said combination device into said simulated receiving mode.

6. A fax and phone combination device as claimed in claim 1, further comprising a keypad for inputting first control information, said switching means re-routing a call from said external phone means to said internal phone means or said fax means in response to said first control information.

7. A fax and phone combination device as claimed in claim 1, said switching means re-routing a call from said internal phone means to said external phone means or said fax means in response to a second control information inputted through said keypad.

8. A fax and phone combination device as claimed in claim 1, wherein said switching means is capable of establishing an intercom connection between said internal and said external phone means.

9. A fax and phone combination device as claimed in claim 1, wherein said external phone means is a cordless telephone.

* * * * *